(12) United States Patent
Metzikis

(10) Patent No.: US 7,611,186 B2
(45) Date of Patent: Nov. 3, 2009

(54) PROTECTIVE COVER FOR A MOTORBIKE

(76) Inventor: George Metzikis, 29 Gipps Crescent, Barrack Heights, NSW 2528 (AU)

( * ) Notice: Subject to any disclaimer, the term of this patent is extended or adjusted under 35 U.S.C. 154(b) by 245 days.

(21) Appl. No.: 10/592,097

(22) PCT Filed: Mar. 9, 2005

(86) PCT No.: PCT/AU2005/000336

§ 371 (c)(1),
(2), (4) Date: Sep. 6, 2006

(87) PCT Pub. No.: WO2005/085052

PCT Pub. Date: Sep. 15, 2005

(65) Prior Publication Data

US 2007/0257478 A1    Nov. 8, 2007

(30) Foreign Application Priority Data

Mar. 10, 2004   (AU) .............................. 2004901212

(51) Int. Cl.
*B62J 17/00* (2006.01)

(52) U.S. Cl. ............... 296/78.1; 296/77.1; 296/136.03; 296/136.06; 296/136.07; 296/136.08; 280/304.3; 180/68.1

(58) Field of Classification Search ............. 280/304.3, 280/219, 229, 77.1, 78.1; 180/219, 229, 180/68.1; 296/77.1, 78.1, 136.03, 136.04, 296/136.06, 136.07, 136.08
See application file for complete search history.

(56) References Cited

U.S. PATENT DOCUMENTS

| 462,511 | A | * | 11/1891 | Yoshimura | .................. 213/176 |
| 2,638,378 | A | * | 5/1953 | Molinaro | ............... 296/136.03 |
| 3,021,894 | A | * | 2/1962 | La Due | ...................... 160/23.1 |
| 3,218,774 | A | * | 11/1965 | Nixon | ......................... 52/602 |
| 4,283,084 | A | * | 8/1981 | Gallagher | .................. 296/78.1 |
| 4,359,233 | A |   | 11/1982 | Jackson et al. | |
| 4,411,333 | A | * | 10/1983 | Bothwell | ..................... 180/219 |
| 4,469,256 | A | * | 9/1984 | McEwen | ..................... 224/413 |
| 4,515,405 | A | * | 5/1985 | Ogishima | .................. 296/78.1 |

(Continued)

FOREIGN PATENT DOCUMENTS

GB      920450      3/1963

(Continued)

OTHER PUBLICATIONS

International Search Report mailed Apr. 26, 2005 by the European Patent Office in counterpart foreign application No. PCT/AU2005/000336.

(Continued)

*Primary Examiner*—Christopher P Ellis
*Assistant Examiner*—Jacob Meyer
(74) *Attorney, Agent, or Firm*—Abelman, Frayne & Schwab

(57) ABSTRACT

A protective cover (30) for a motorbike, the motorbike including a fairing over forward parts of the motorbike, the cover (30) having a shape that conforms to the shape of at least a front portion of the fairing and being adapted for attachment there over by fastening means (82, 84) so as to prevent debris striking the fairing from the direction of vehicles travelling ahead of the motorbike, and wherein the cover (30), in use, is in one piece.

9 Claims, 4 Drawing Sheets

U.S. PATENT DOCUMENTS

| | | | | |
|---|---|---|---|---|
| 4,703,825 | A * | 11/1987 | Mikami et al. | 180/229 |
| 4,776,422 | A * | 10/1988 | Sakuma | 180/219 |
| 4,799,728 | A * | 1/1989 | Akers et al. | 296/136.04 |
| 4,997,229 | A * | 3/1991 | Swanson | 296/136.08 |
| 5,201,565 | A * | 4/1993 | Berardino | 296/136.03 |
| 5,330,029 | A * | 7/1994 | Yoshimura et al. | 180/219 |
| 5,458,390 | A | 10/1995 | Gilbert | |
| 5,562,139 | A | 10/1996 | Cseri | |
| 5,944,347 | A | 8/1999 | Pechman | |
| 6,062,601 | A | 5/2000 | Willie et al. | |
| 6,209,599 | B1 * | 4/2001 | Richardson | 150/167 |
| 6,896,278 | B1 * | 5/2005 | Hepburn | 280/304.3 |
| 6,951,361 | B2 * | 10/2005 | Keys | 296/77.1 |
| 7,032,948 | B2 * | 4/2006 | Khan | 296/78.1 |
| 7,370,902 | B2 * | 5/2008 | Seki et al. | 296/78.1 |
| 7,404,585 | B2 * | 7/2008 | Bugni | 296/78.1 |
| 7,464,781 | B2 * | 12/2008 | Guay et al. | 180/68.4 |
| 2004/0051336 | A1 * | 3/2004 | Chiao et al. | 296/78.1 |
| 2005/0146152 | A1 * | 7/2005 | Keys | 296/77.1 |
| 2005/0200153 | A1 * | 9/2005 | Khan | 296/78.1 |
| 2008/0141821 | A1 * | 6/2008 | Degarate et al. | 74/551.8 |

FOREIGN PATENT DOCUMENTS

| | | |
|---|---|---|
| WO | WO 96/00677 | 1/1996 |

OTHER PUBLICATIONS

Written Opinion of the ISA mailed Apr. 26, 2005 by the Australian Patent Office and corresponding to foreign application No. PCT/AU2005/000336.

"Cary's BMW Homepage," Internet article, anonymous, http://web.archive.org/web/20031006011318/http://bmwdude.home.mindspring.com/, Oct. 6, 2003.

Supplementary European Search Report, Apr. 10, 2008.

* cited by examiner

PROTECTIVE COVER FOR A MOTORBIKE

TECHNICAL FIELD

The present invention relates to a protective cover for a motorbike.

BACKGROUND ART

A motorbike, like all ground vehicles, is susceptible to damage from rocks, pebbles and other surface debris striking the motorbike after being flung into the air by the effect of the motorbike's rotating front wheel, or by other vehicles travelling on a road or loose surface ahead of the motorbike. Commonly, the debris strikes at high speed and can cause significant damage to forward parts of the motorbike, such as the headlight and fairing that confers aerodynamic properties to the motorbike.

It is known to provide separate upper fairing bras and cowling (lower fairing) bras for a motorbike, but these bras to not protect the fairing from top to bottom, thereby exposing parts of the fairing to damage.

It is an object of the present invention to provide a protective cover for a motorbike that prevents surface debris which impacts upon forward parts of the motorbike from causing damage thereto.

It is another object of the present invention to provide such a protective cover that protects the fairing from top to bottom against damage.

It is yet another object of the present invention to provide such a protective cover that, in use, is in one piece and, preferably, provides headlight protection.

DISCLOSURE OF THE INVENTION

According to the invention, there is provided a protective cover for a motorbike, the motorbike including a fairing over forward parts of the motorbike, the cover having a shape that conforms to the shape of at least a front portion of the fairing and being adapted for attachment thereover by fastening means so as to prevent debris striking the fairing from the direction of vehicles travelling ahead of the motorbike, and wherein the cover, in use, is in one piece.

Preferably, the protective cover includes a transparent sheet having a shape that conforms to the shape of a headlight of the motorbike, and being adapted for placement thereover.

It is preferred that the protective cover includes mesh portions to cover respective air intake and exhaust cooling ports through the fairing.

MODES FOR CARRYING OUT THE INVENTION

Figure 1:
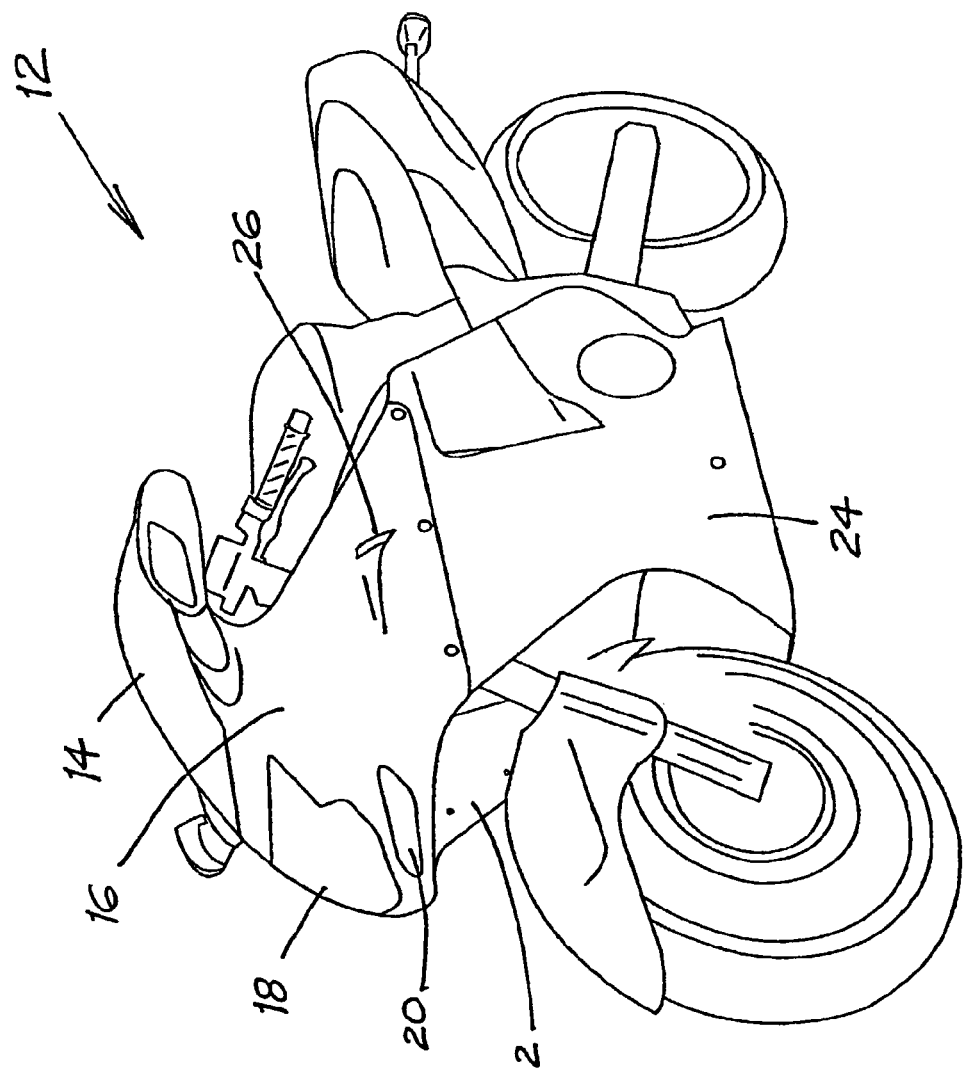
FIG. 1 is a perspective view of a motorbike and a preferred protective cover of the invention, the protective cover shown separated from the motorbike but conforming to the shape of the front portion of the fairing of the motorbike.
Figure 1:
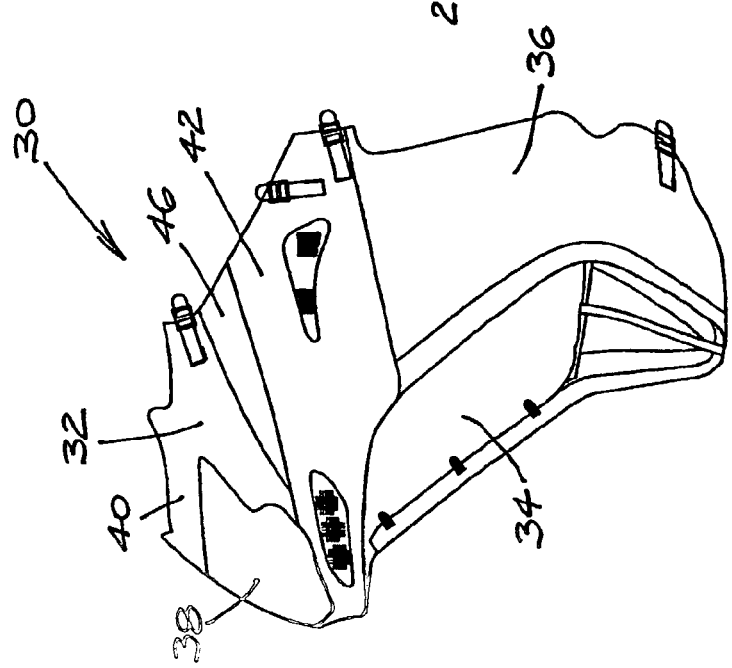
Figure 2:
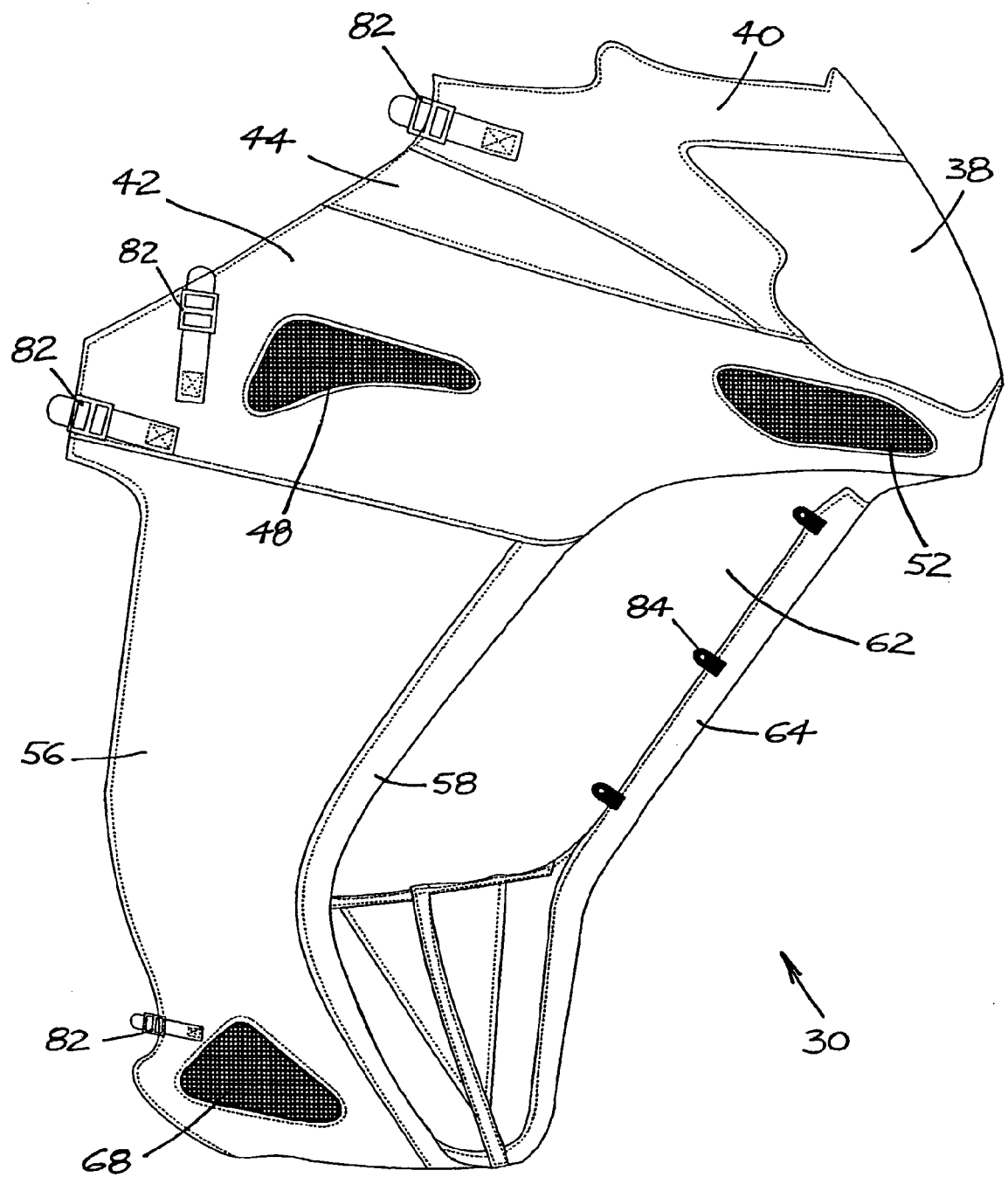
FIG. 2 is a perspective view of the front right side of the protective cover shown in FIG. 1.
Figure 3:
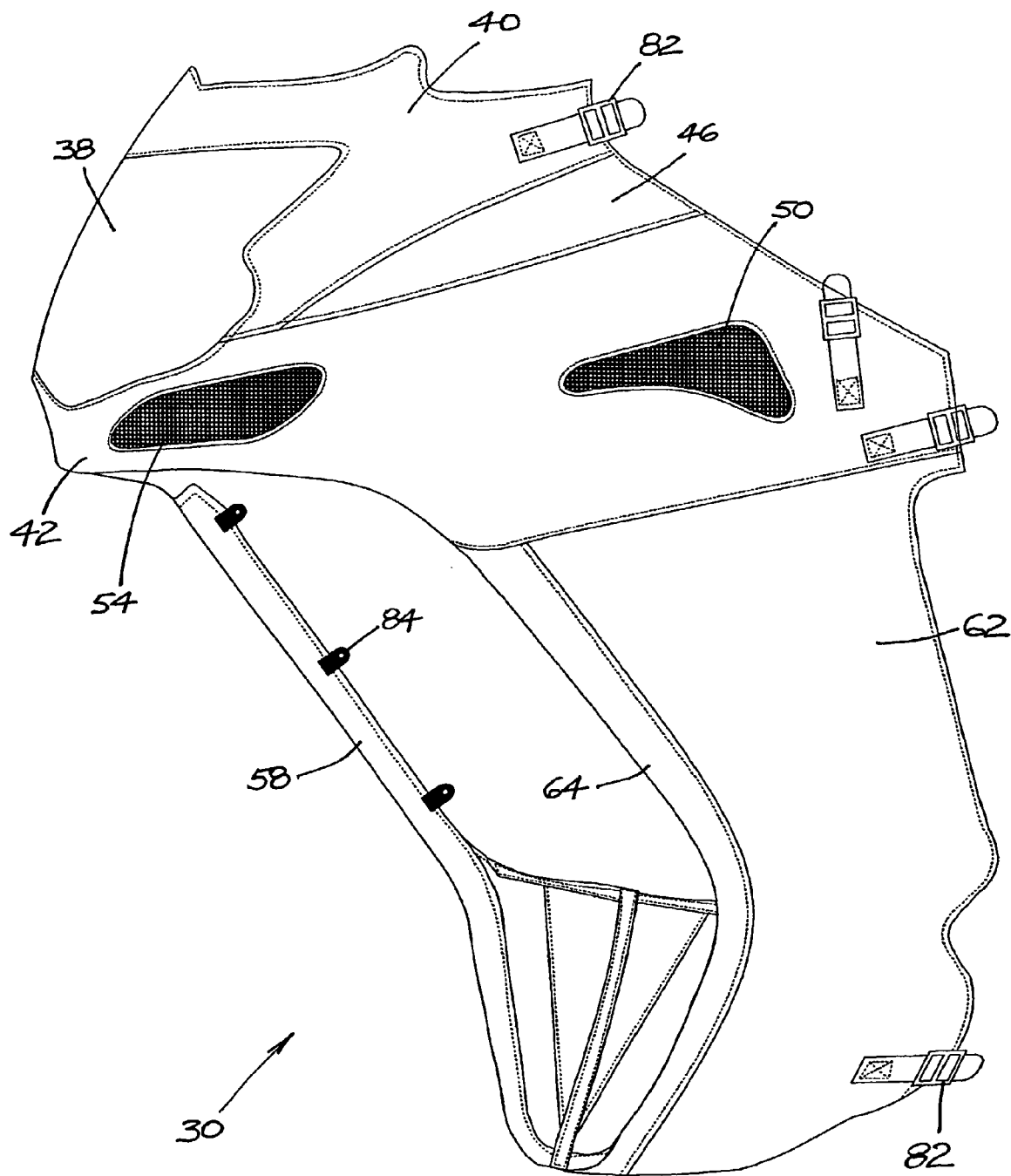
FIG. 3 is a perspective view of the front left side of the protective cover shown in FIG. 1.

The motorbike 12 shown in FIG. 1 is of a conventional "sportbike" design, and includes (among other things) a windshield 14, a front top fairing portion 16, a headlight 18, a ram air intake port 20, a right bottom fairing portion 22, a left bottom fairing portion 24, and an air flow port 26.

The protective cover 30 includes a front top cover portion 32, a right bottom cover portion 34, and a left bottom cover portion 36, all of which may be made of an outer surface of marine grade vinyl bonded to a 1 mm thick intermediate layer of black CVS Neoprene (poly(2-chloro-1,3-butadiene) with an inner surface of anti-abrasion specified nylon OK T-CLOTH™ that will press against the fairing surface. A contact adhesive is used to bond the three layers together.

The protective cover 30 also includes a transparent headlight cover portion 38 which may be made of a 1 mm thick, flexible, moulded, clear plastic sheet.

The front top cover portion 32 has an upper section 40, a lower section 42, and a pair of joining sections 44, 46, all of which are secured together with thread which is stitched top over bottom.

The lower section 42 of the front top cover portion 32 includes flexible fibreglass mesh portions 48, 50 for covering air flow ports 26 through the fairing, and flexible fibreglass mesh portions 52, 54 for covering ram air intake ports 20 through the fairing.

The right bottom cover portion 34 has a side section 56, a front section 58, and a lower flap section 60, all of which are secured together by stitched thread. The left bottom cover portion 36 has the same arrangement of sections 62, 64 and 66.

The side section 56 of the right bottom cover portion 34 includes a flexible fibreglass mesh portion 68 for covering the exhaust cooling port (not shown) through the fairing.

Figure 4:
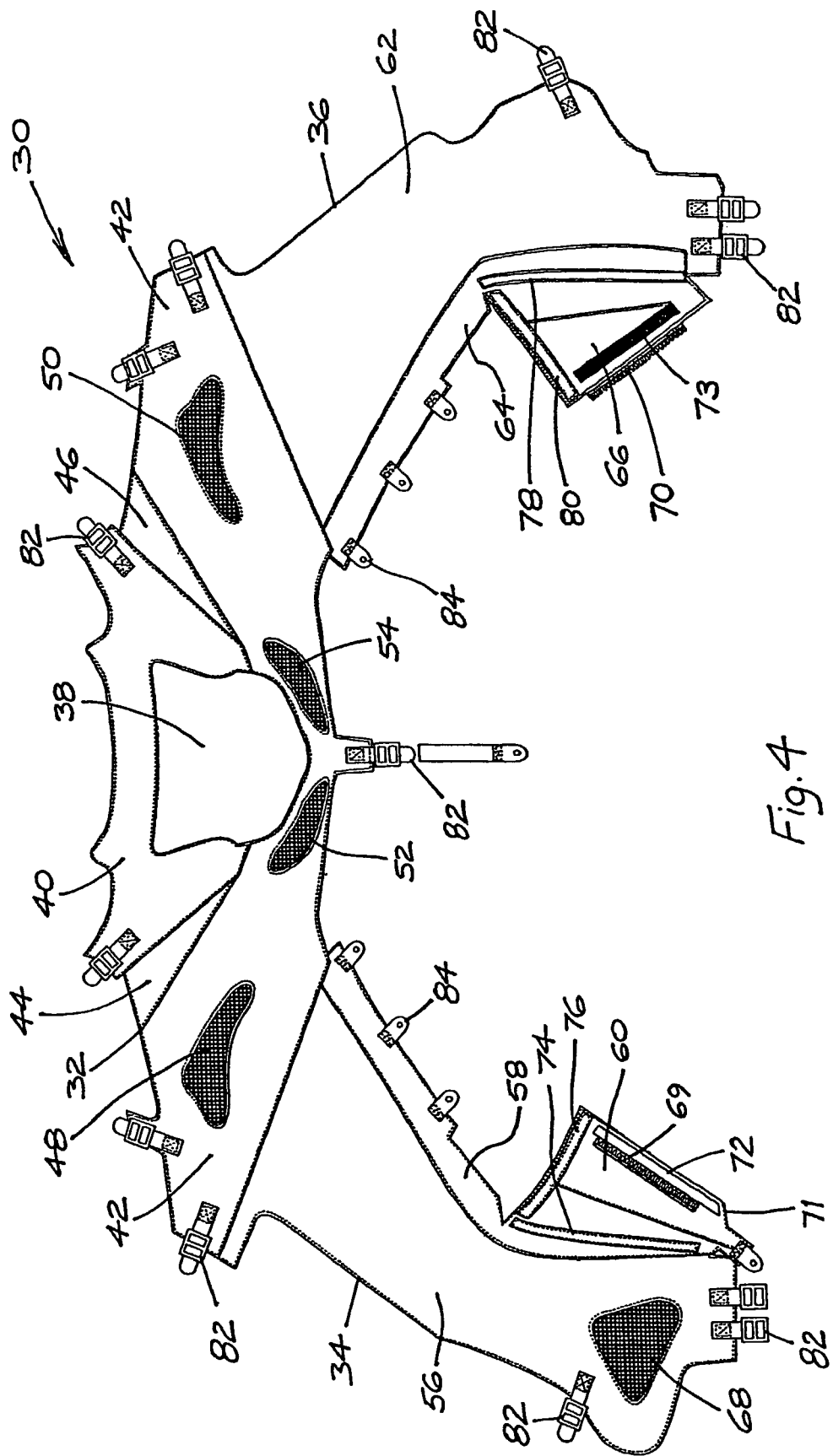
FIG. 4 is a plan view of the protective cover shown in FIGS. 1, 2 and 3 when laid flat.

The lower flap sections 60, 66 are adapted to be connected together by a zip-fastener comprising interlockable lengths of teeth 69, 70 affixed on respective opposed edge regions and an attached slide piece for uniting or separating them. A protective vinyl flap extension 71 extends from the edge region on which the teeth 69 are affixed and has a respective one of either a hook or loop strip 72 affixed adjacent the free edge thereof for fastening to a mating strip 73 affixed to the flap section 66 when the cover 30 is in use. In FIG. 4, the teeth 69 are shown for ease of understanding, but are in fact located on the opposite side of the lower flap section 60 to that shown.

There are metal inserts 74, 76 in the right bottom cover portion 34 and metal inserts 78, 80 in the left bottom cover portion 36 for maintaining the correct desired shape of the cover 30 around the cowling region of the fairing when in use.

There are a plurality of 25 mm wide nylon straps with adjustable buckles 82, and a plurality of leather fastening straps 84, as particularly shown in FIG. 4, or plastic coated metal hooks affixed to the cover by elastic straps, at various locations on the cover 30.

As will be apparent to persons skilled in the art, the embodiment of protective cover 30 described above provides front end protection to the fairing (from top to bottom), headlight, and air intake and exhaust cooling ports of a motorbike against damage caused by rocks, pebbles and other surface debris, as well as by insects, road grime, weather conditions, mud and other possible damaging agents.

Various modifications may be made in details of design and construction of the protective cover without departing from the scope and ambit of the invention.

The invention claimed is:

1. A protective cover for a motorbike, the motorbike including a fairing over forward parts of the motorbike, the cover comprising:
   a front top cover portion configured to cover a top front-end portion of said fairing;

at least one fastener for attaching the cover to the fairing;

wherein the cover, in use, is in one piece and conforms to the shape of at least a portion of the fairing; and characterized in that the cover further comprises a right bottom cover portion configured to cover a right bottom portion of the fairing, and a left bottom cover portion configured to cover a left bottom portion of the fairing; and wherein the right bottom cover portion and the left bottom cover portion each have a side section, a front section and a lower flap section, said lower flap sections being configured to be connected together by the at least one fastener to cover a bottom front-end portion of the fairing behind the motorbike's front wheel such that, in use, said cover protects the top and bottom front-end portions of the fairing from debris striking from the direction of vehicles travelling ahead of the motorbike.

2. The protective cover of claim 1 further comprising a transparent sheet having a shape that conforms to the shape of a headlight of the motorbike, and positioned for placement thereover.

3. The protective cover of claim 1 further comprising mesh portions corresponding to and covering air intake and exhaust cooling ports in the fairing.

4. The protective cover of claim 1, wherein each cover portion is made of an outer surface of marine grade vinyl fabric bonded to an intermediate layer of poly(2-chloro-1,3-butadiene) with an inner surface of a non-abrasive nylon cloth material.

5. The protective cover of claim 3, wherein the front top cover portion includes an upper section and a lower section, the lower section including fiberglass mesh portions for covering air flow ports in the fairing and including fiberglass mesh portions for covering ram air intake ports in the fairing.

6. The protective cover of claim 1, wherein the side section of the right bottom cover portion includes a fiberglass mesh portion for covering an exhaust cooling port in the fairing.

7. The protective cover of claim 6, wherein the at least one fastener for the lower flap sections are configured to be connected together by a zipper fastener comprising interlockable lengths of teeth affixed on respective opposed edge regions and an attached slide piece for uniting or separating them.

8. The protective cover of claim 7, wherein a flap extension extends from an edge region of a first one of said lower flap sections, one length of zipper teeth being affixed on the edge region, the flap extension having a respective one of either hook or loop strip affixed adjacent a free edge thereof for fastening to a mating hook or loop strip affixed to a second one of said lower flap sections on which another length of zipper teeth are affixed when the zipper fastener has connected the lower flap sections together.

9. The protective cover of claim 1, wherein the right bottom cover portion and the left bottom cover portion each include hardened inserts for maintaining a predetermined desired shape of the cover when in use around a cowling region of the fairing.

\* \* \* \* \*

UNITED STATES PATENT AND TRADEMARK OFFICE
CERTIFICATE OF CORRECTION

PATENT NO. : 7,611,186 B2
APPLICATION NO. : 10/592097
DATED : November 3, 2009
INVENTOR(S) : George Metzikis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Twelfth Day of October, 2010

David J. Kappos
*Director of the United States Patent and Trademark Office*